United States Patent
Ishihara

(10) Patent No.: US 12,544,999 B2
(45) Date of Patent: Feb. 10, 2026

(54) MOLD FOR FORMING A TIRE AND TIRE PRODUCTION METHOD

(71) Applicant: BRIDGESTONE CORPORATION, Tokyo (JP)

(72) Inventor: Yasuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 151 days.

(21) Appl. No.: 18/563,979

(22) PCT Filed: Nov. 24, 2021

(86) PCT No.: PCT/JP2021/043047
§ 371 (c)(1),
(2) Date: Nov. 24, 2023

(87) PCT Pub. No.: WO2022/269940
PCT Pub. Date: Dec. 29, 2022

(65) Prior Publication Data
US 2024/0262063 A1    Aug. 8, 2024

(30) Foreign Application Priority Data

Jun. 22, 2021 (JP) .................................. 2021-103646

(51) Int. Cl.
*B29D 30/06* (2006.01)

(52) U.S. Cl.
CPC .. *B29D 30/0629* (2013.01); *B29D 2030/0631* (2013.01)

(58) Field of Classification Search
CPC ........ B29D 30/0629; B29D 2030/0607; B29D 2030/0631

(Continued)

(56) References Cited

U.S. PATENT DOCUMENTS

| 7,025,581 B2 | 4/2006 | Kata |
| 7,201,570 B2 | 4/2007 | Ohara |

(Continued)

FOREIGN PATENT DOCUMENTS

| JP | 2000326332 A | 11/2000 |
| JP | 2000334740 A | 12/2000 |

(Continued)

OTHER PUBLICATIONS

Yuichiro Ogawa, JP-4191294-B2, machine translation. (Year: 2008).*

(Continued)

*Primary Examiner* — Sedef E Paquette
(74) *Attorney, Agent, or Firm* — KENJA IP LAW PC

(57) ABSTRACT

Provided are a mold for forming a tire including a tread molding part which is configured to be opened and closed by moving a plurality of segments in a radial direction, and a tire production method using the same. In the mold, each of the segments includes a holder; a plurality of design surface dividing mold parts disposed in a circumferentially arranged manner on a radially inner side of the holder; and a plate spring member to which the plurality of the design surface are fixed and in which both ends of the plate spring member in a circumferential direction are fixed to the holder, and when the tread molding part is opened, by elastic deformation of the plate spring member, the plurality of the design surface are moved in a direction away from the holder with the plurality of the design surface dividing mold parts being rotated.

5 Claims, 7 Drawing Sheets

(58) Field of Classification Search
USPC .......................................................... 425/28.1
See application file for complete search history.

(56) References Cited

U.S. PATENT DOCUMENTS

| 7,572,120 | B2 |   | 8/2009 | Ouyahia et al. |            |
|-----------|-----|---|--------|----------------|------------|
| 2006/0008547 | A1 |   | 1/2006 | Ohara       |            |
| 2007/0248707 | A1 | * | 10/2007 | Ohara ................ | B29D 30/0629 |
|           |    |   |        |                | 425/47     |
| 2008/0191389 | A1 | * | 8/2008 | Hyodo .................. | B29C 33/302 |
|           |    |   |        |                | 264/319    |
| 2010/0303941 | A1 | * | 12/2010 | Secchi ............... | B29D 30/0629 |
|           |    |   |        |                | 425/47     |

FOREIGN PATENT DOCUMENTS

| JP | 2006021357 | A |   | 1/2006 |              |
|----|------------|---|---|--------|--------------|
| JP | 4191294    | B2 | * | 12/2008 | ......... B29D 30/0629 |
| JP | 2009149079 | A |   | 7/2009 |              |
| JP | 2011073252 | A |   | 4/2011 |              |
| WO | 03008169   | A1 |   | 1/2003 |              |
| WO | 03008619   | A1 |   | 1/2003 |              |

OTHER PUBLICATIONS

Jan. 25, 2022, International Search Report issued in the International Patent Application No. PCT/JP2021/043047.

Dec. 14, 2023, International Preliminary Report on Patentability issued in the International Patent Application No. PCT/JP2021/043047.

Sep. 12, 2024, search result of the Extended European Search Report issued by the European Patent Office in the corresponding European Patent Application No. 21947219.8.

* cited by examiner

MOLD FOR FORMING A TIRE AND TIRE PRODUCTION METHOD

TECHNICAL FIELD

This disclosure relates to a mold for forming a tire and a tire production method.

BACKGROUND

In a known conventional mold for forming a tire for use in vulcanization molding of an unvulcanized raw tire to produce a tire, it is known that an annular tread molding part (a tread mold) for forming a tread of a tire is divided into a plurality of segments arranged in a circumferential direction and is configured to be opened and closed by moving each of the segments in a radial direction (for example, see PTLs 1 to 3).

CITATION LIST

Patent Literature

PTL 1: JP 2000-326332 A
PTL 2: JP 2000-334740 A
PTL 3: JP 2009-149079 A

SUMMARY

Technical Problem

In the above-described conventional mold for forming a tire described above, the tread design surface oriented toward the radially inner side of each of the segments is typically provided with projections such as ribs or blades protruding from the tread design surface toward a radially inner side, in order to form a tread pattern with recesses and protrusions consisting of, for example, grooves and sipes on a tread of the formed tire.

However, in the configuration where the tread design surface is provided with the projections, when the tire is released from the tread molding part by moving the segments toward the radially outer side after vulcanization molding, high undercut resistance of the tread is caused by the projections, especially on the sides of both ends of the segments in a circumferential direction. Therefore, in the case of, for example, forming a tire having a complex tread pattern, defects such as permanent deformation in the tread of the tire after the mold releasing and the failure of the projections can be caused by excessively high undercut resistance described above.

This disclosure has been accomplished in view of the above-described problem and it is an object of this disclosure to provide a mold for forming a tire and a tire production method which can reduce undercut resistance of the tread caused by the projections in mold releasing of a tire.

Solution to Problem

The mold for forming the tire of this disclosure is configured in such a way that a mold for forming a tire for vulcanization molding of an unvulcanized raw tire into a tire including an annular tread molding part which is divided into a plurality of segments arranged in a circumferential direction and which is configured to be opened and closed by moving each of the segments in a radial direction, wherein each of the segments includes a holder to be driven toward a radially outer side when the tread molding part is opened, and a plurality of design surface dividing mold parts, each of which includes a tread design surface for forming a tread of the tire and which are disposed in a circumferentially arranged manner on a radially inner side of the holder, and a plate spring member which is disposed between the holder and the plurality of the design surface dividing mold parts and to which the plurality of the design surface dividing mold parts are fixed and in which both ends of the plate spring member in a circumferential direction are fixed to the holder, and when the tread molding part is opened after vulcanization molding of the tire, by elastic deformation of the plate spring member toward a radially inner side, the plurality of the design surface dividing mold parts are moved in a direction away from the holder with the plurality of the design surface dividing mold parts being rotated around an axis parallel to an axis of the tread molding part.

In an embodiment, the mold for forming the tire of this disclosure can be configured in such a way that one end of the plate spring member in a circumferential direction is fixed to an end surface of the holder on one side in a circumferential direction and the other end of the plate spring member in a circumferential direction is fixed to an end surface of the holder on the other side in a circumferential direction.

In an embodiment, a mold for forming a tire of this disclosure can be configured to include the plurality of plate spring member disposed in a manner spaced apart in a direction parallel to an axis of the tread molding part.

The tire production method of this disclosure is a tire production method for vulcanization molding of an unvulcanized raw tire to produce a tire by using a mold for forming a tire including an annular tread molding part which is divided into a plurality of segments arranged in a circumferential direction and which is configured to be opened and closed by moving each of the segments in the radial direction, wherein the tread molding part is provided with a plurality of design surface dividing mold parts, each of which is fixed to a plate spring member and which are provided in a circumferentially arranged manner, and when each of the segments is moved toward a radially outer side to open the tread molding part, the tire is released from the tread molding part with the plate spring member being elastically deformed toward a radially inner side and the plurality of the design surface dividing mold parts being rotated around an axis parallel to an axis of the tread molding part.

Advantageous Effect

This disclosure can provide a mold for forming a tire and a tire production method which can reduce undercut resistance of the tread caused by the projections in mold releasing of a tire.

DETAILED DESCRIPTION

Figure 1:
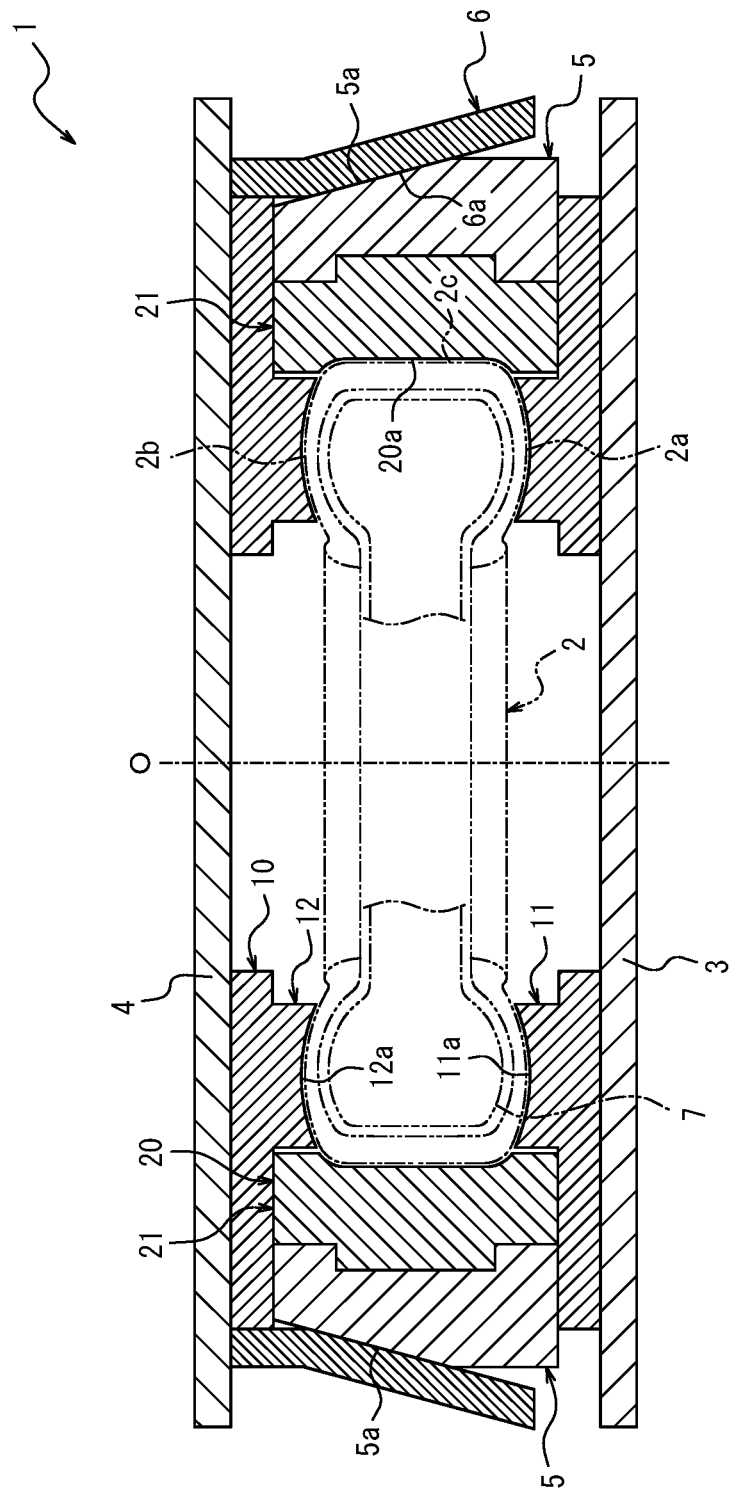
FIG. 1 is a cross-sectional view of a mold for forming a tire according to an embodiment of this disclosure, which is illustrated in a front view.

By way of example, a mold for forming a tire and a tire production method according to an embodiment of this disclosure will now be described in detail with reference to the drawings. In this regard, common members and portions appearing in the drawings have the same reference signs.

A mold for forming a tire 1 illustrated in FIG. 1 according to an embodiment of this disclosure is for use in forming an unvulcanized (before vulcanization) raw tire based on a synthetic rubber into a predetermined shape with the raw tire being vulcanized to produce a tire 2.

In this regard, the tire 2 is a hollow tire based on a synthetic rubber including a pair of sidewalls 2a, 2b and a tread 2c, and is shaped to provide the interior of the tire 2 with a space for filling of a gas such as air or nitrogen.

The mold for forming the tire 1 includes a sidewall molding part 10 and a tread molding part 20.

For example, the sidewall molding part 10 can include an annular lower sidewall molding part 11 fixed to a top surface of a lower container 3, and an annular upper sidewall molding part 12 fixed to a bottom surface of an upper container 4.

Figure 3:
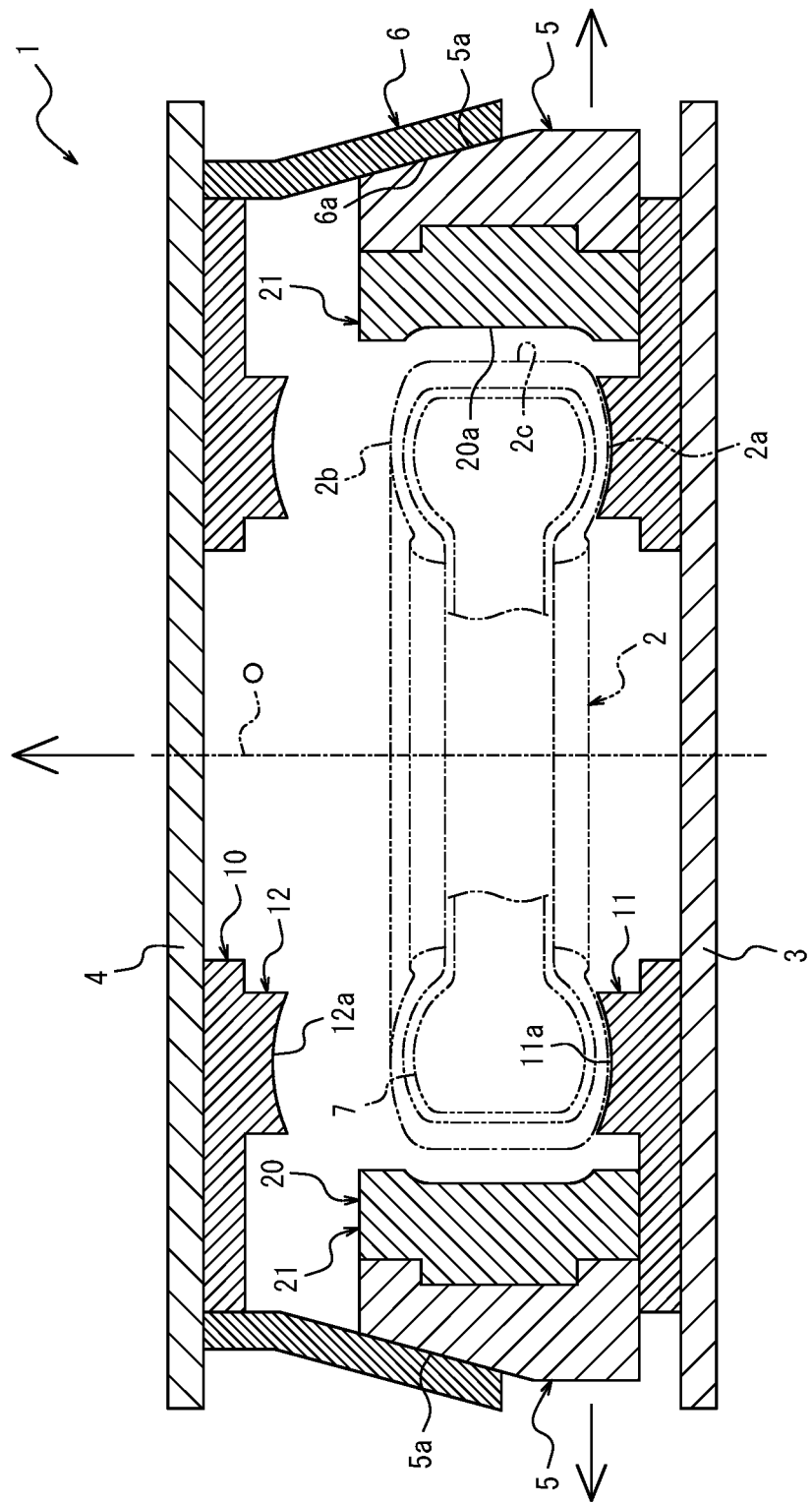
FIG. 3 is a cross-sectional view of the mold for forming the tire illustrated in FIG. 1 when the mold for forming the tire is opened, which is illustrated in a front view.

The sidewall molding part 10 can dispose (accommodate) an annular tire 2 or a raw tire between the lower sidewall molding part 11 and the upper sidewall molding part 12 to be in an orientation by which the central axis of the raw tire becomes coaxial with the central axis O of the sidewall molding part 10. The lower sidewall molding part 11 includes a lower sidewall design surface 11a, which is in the form of a ring around the central axis O and is oriented toward the upward direction. The lower sidewall molding part 11 can form an outer surface of a sidewall 2a of one of the tire 2 or the raw tire (any of which is oriented toward the downward direction in FIG. 1) by the lower sidewall design surface 11a. Similarly, the upper sidewall molding part 12 includes an upper sidewall design surface 12a, which is in the form of a ring around the central axis O and is oriented toward the downward direction. The upper sidewall molding part 12 can form an outer surface of a sidewall 2b of the other of the tire 2 or the raw tire (any of which is oriented toward the upward direction in FIG. 1) by the upper sidewall design surface 12a. As illustrated in FIG. 3, by moving the upper container 4 upwardly (the direction in which the upper container 4 and the lower container 3 is moved away from each other along the central axis of the tire 2) and relatively to the lower container 3, the sidewall molding part 10 is opened and the tire 2 is released from the sidewall molding part 10. By moving the upper container 4 downwardly to its original position illustrated in FIG. 1, the sidewall molding part 10 in an opened configuration is closed to allow for forming of the tire 2 or the raw tire.

In this regard, modifications can be made to the configuration of the sidewall molding part 10 as appropriate, and examples of such modifications include a configuration in which the sidewall molding part 10 is opened by moving the lower container 3 downwardly and relatively to the upper container 4.

The tread molding part 20 is annular and coaxial with the sidewall molding part 10 and is disposed adjacent to a radially outer side of the lower sidewall molding part 11 and the upper sidewall molding part 12. The inner circumferential surface oriented toward the radially inner side of the tread molding part 20 is a tread design surface 20a for forming an outer circumferential surface of the tread 2c of the tire 2.

Figure 2:
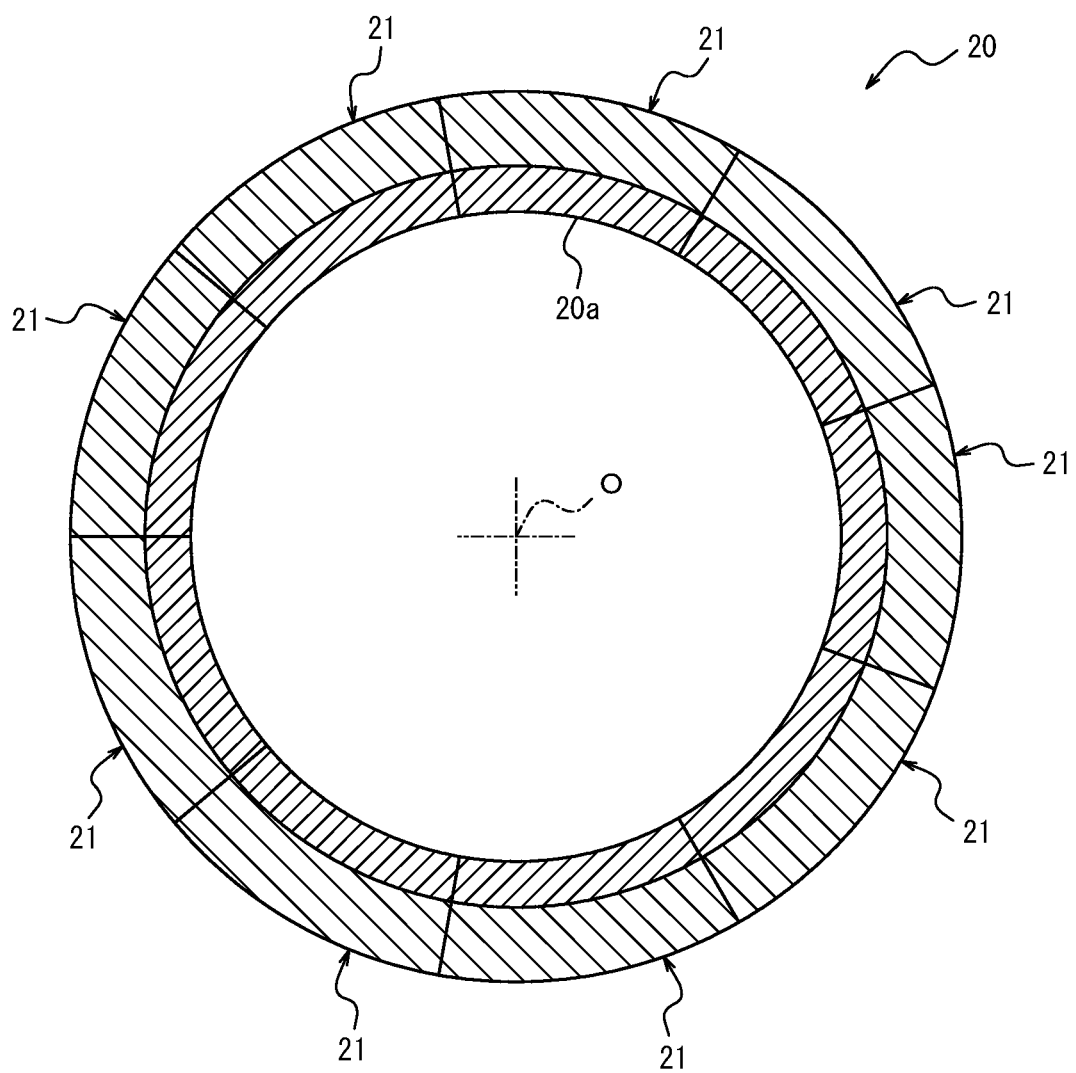
FIG. 2 is a cross-sectional view of the tread molding part illustrated in FIG. 1, which is illustrated in a planar view.

As illustrated in FIG. 2, the tread molding part 20 is divided into a plurality of segments 21 arranged in a circumferential direction. Each of the segments 21 is in the form of arc in a planar view and the segments 21 are combined in a circumferentially arranged manner to constitute a tread molding part 20, which is an annular mold as a whole. In this embodiment, the tread molding part 20 is divided into nine segments 21 having the same length in a circumferential direction. In this regard, the division number of the tread molding part 20 in a circumferential direction is preferably, but not limited to, 7 to 13 and can be changed as appropriate.

As illustrated in FIG. 1, an outer circumferential surface, oriented toward the radially outer side, of each of the segments 21 is fixed to the interior of intermediate container 5 corresponding to each of the segments 21, and each of the segments 21 is driven by the intermediate container 5 to move toward a radial direction centered on the axis of the tread molding part 20 (central axis O). The tread molding part 20 can be opened and closed by moving each of the segments 21 in a radial direction.

More particularly, the outer circumferential surface of the intermediate container 5 oriented toward the radially outer side is provided with a tapered surface 5a inclined in such a way that the outer diameter of the tapered surface 5a gradually becomes smaller toward the upward direction. To the bottom surface of the upper container 4, an annular outer ring 6 disposed on the radially outer side of the intermediate container 5 is fixed. The inner circumferential surface of the outer ring 6 oriented toward the radially inner side is provided with a tapered surface 6a inclined in such a way that the outer diameter of the tapered surface 6a gradually becomes smaller toward the upward direction. The outer ring 6 is coupled with each of the intermediate containers 5, for example, by using a guide member (not illustrated) in such a way that the tapered surface 6a slides along the tapered surface 5a of the intermediate container 5 in an up-down direction.

Figure 4:
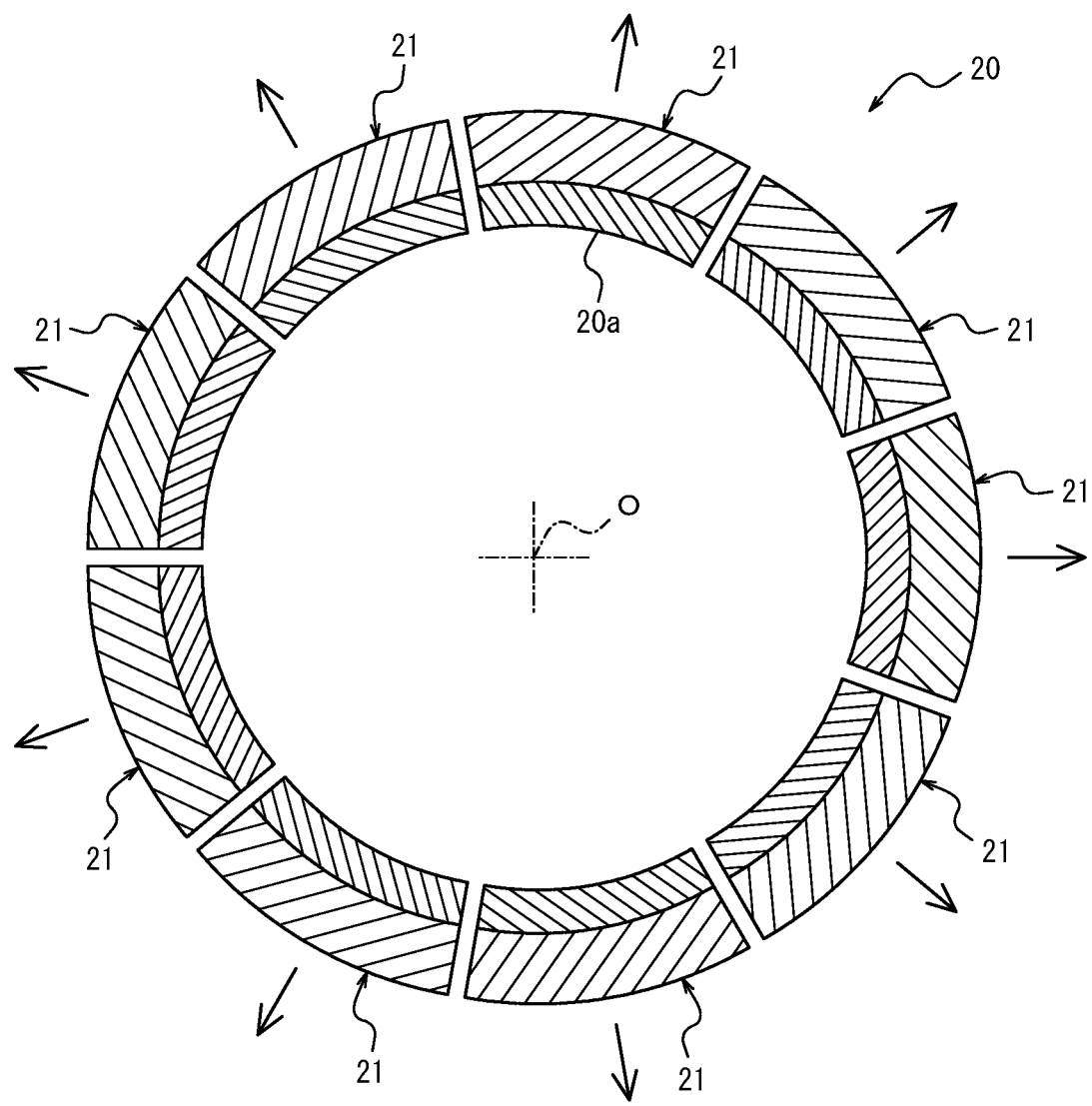
FIG. 4 is a cross-sectional view of the tread molding part illustrated in FIG. 1 when the tread molding part is opened, which is illustrated in a planar view.

When the upper container 4 is moved upwardly and relatively to the lower container 3, the outer ring 6 is moved upwardly and relatively to each of the intermediate containers 5 with the tapered surface 6a being sliding along the tapered surface 5a of the intermediate container 5. As a result of this, as illustrated in FIG. 3, each of the intermediate containers 5 is moved toward the radially outer side centered on the axis of the tread molding part 20. When each of the intermediate containers 5 is moved toward the radially outer side centered on the axis of the tread molding part 20, as illustrated in FIGS. 3 and 4, each of the segments 21 is driven by an intermediate container 5 corresponding to each of the segments 21 to move, together with the intermediate container 5, toward the radially outer side. As a result of this, the tread molding part 20 is opened to be in a position at which the tread design surface 20a is separated from the tread 2c of the tire 2 or the raw tire. In this regard, the tread molding part 20 can be configured in such a way that, after the tread molding part 20 is opened as described above, the tread molding part 20 suspended by the outer ring 6 is moved upwardly together with the upper container 4 to a position (an upper position in relation to the position illustrated in FIG. 3) at which the tire 2 after forming can be removed. When the upper container 4 is moved downwardly to its original position illustrated in FIG. 1, the tread molding part 20 is moved downwardly to a position adjacent to the lower sidewall molding part 11. Subsequently, the outer ring 6 is moved downwardly in relation to each of the intermediate containers 5, and each of the intermediate containers 5 is moved toward the radially inner side centered on the axis of the tread molding part 20. As a result of this, as illustrated in FIGS. 1 and 2, each of the segments 21 is driven by the intermediate container 5 corresponding to each of the segments 21 to move, together with the intermediate container 5, toward the radially inner side, and the tread molding part 20 is closed to allow for forming of the tire 2 or the raw tire.

As described above, in the mold for forming the tire 1 of this embodiment, the annular tread molding part 20 is divided into a plurality of segments 21 arranged in a circumferential direction, and is configured to be opened and closed by moving each of the segments 21 in a radial direction.

The opening and closing mechanism of the tread molding part 20 is not limited to a configuration using the outer ring 6 but various configurations can be employed.

The mold for forming the tire 1 includes a bladder 7 which is disposed in the interior of the raw tire and expanded by supplying of pressurized steam. Also, the mold for forming the tire 1 includes a heater (not illustrated) for heating the sidewall molding part 10 and the tread molding part 20. The location of the heater can be determined as appropriate.

Figure 5:
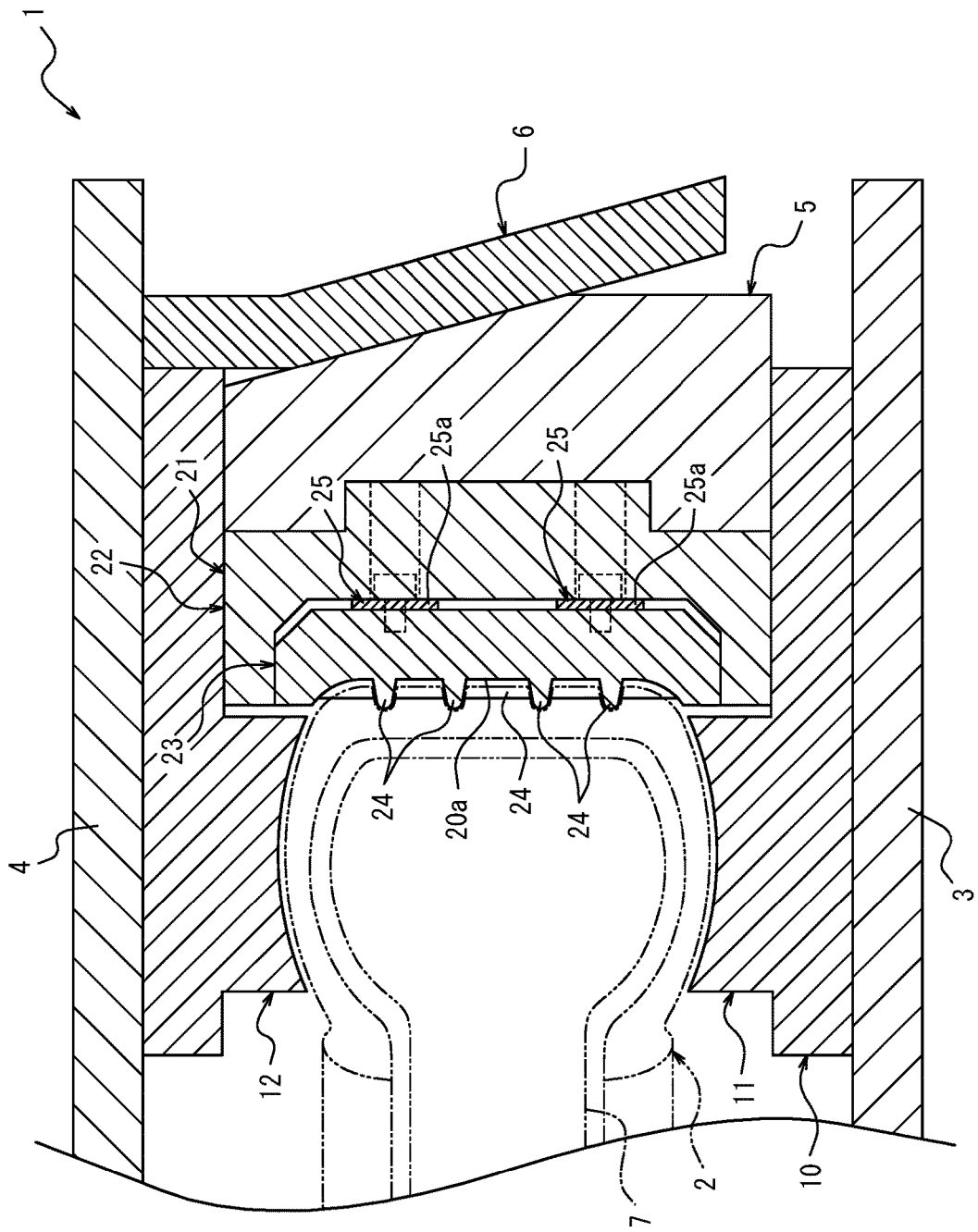
FIG. 5 is an enlarged cross-sectional view of detailed structure of the main portion of the mold for forming the tire illustrated in FIG. 1, which is illustrated in a front view.
Figure 6:
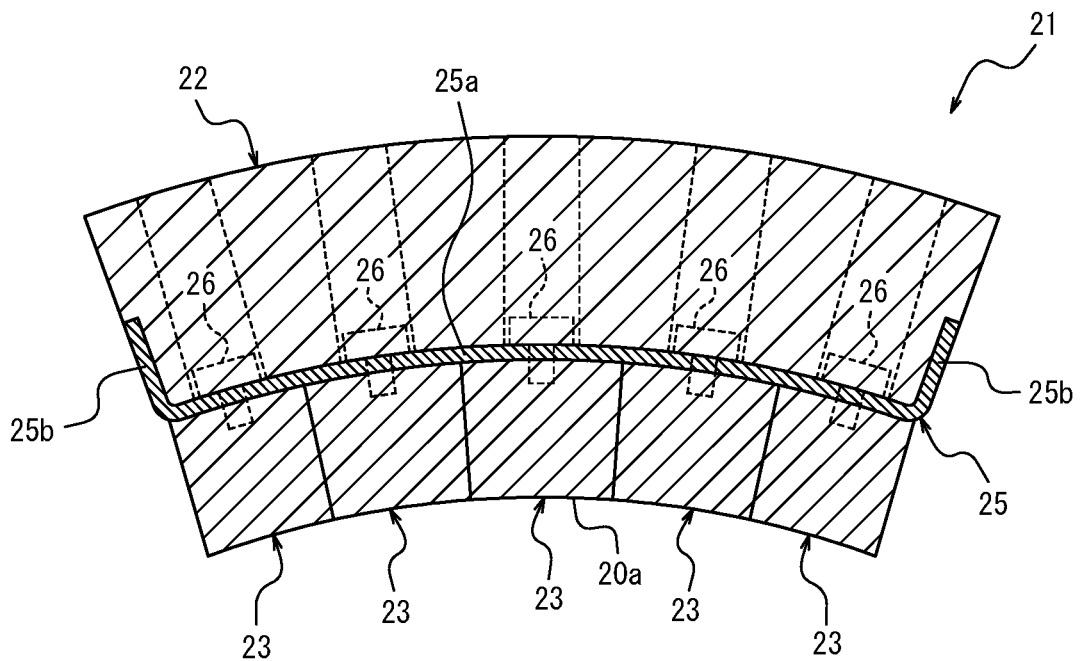
FIG. 6 is a cross-sectional view of one segment illustrated in FIG. 5 in a planar view.

As illustrated in FIGS. 5 and 6, in the mold for forming the tire 1 of this embodiment, each of the plurality of the segments 21 constituting the tread molding part 20 includes a holder 22 and a plurality of design surface dividing mold parts 23, and each of the plurality of the design surface dividing mold parts 23 is arranged in a circumferential direction on a radially inner side of the holder 22. In this embodiment, each of the plurality of the segments 21 includes five design surface dividing mold parts 23.

The holder 22 is a portion which is fixed to the intermediate container 5 and which is driven toward the radially outer side by the intermediate container 5 when tread molding part 20 is opened. When the tread molding part 20 is closed, the holder 22 is driven toward the radially inner side by the intermediate container 5. The holder 22 can be formed, for example, by cutting a block made of metal such as low carbon steel.

In this embodiment, the holder 22 is detachably fixed to the intermediate container 5. As a result of this, a plurality of types of segments 21 having mutually different shapes of the tread design surfaces 20a can be selectively attached to the intermediate container 5, and thus, the mold for forming a tire 1 is applicable in the production of a variety of types of tires 2 having mutually different tread patterns.

Figure 7:
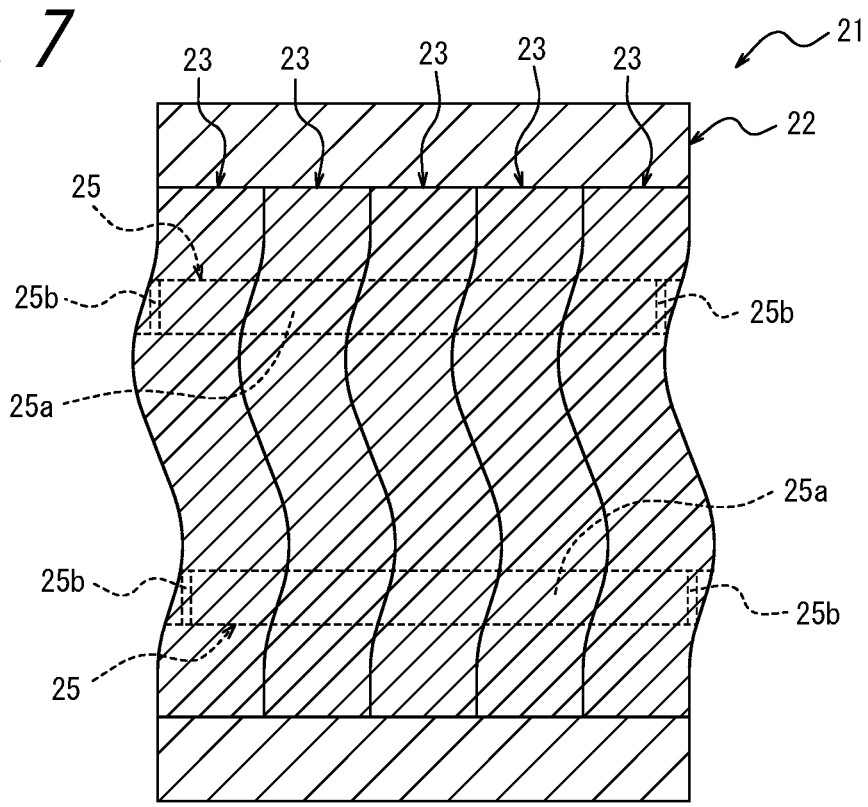
FIG. 7 is a view of one segment illustrated in FIG. 5 from a radially inner side.

The five design surface dividing mold parts 23 are portions which constitute a tread design surface 20a for forming the tread 2c of the tire 2. As illustrated in FIGS. 6 and 7, each of the five design surface dividing mold parts 23 is in the form of arc in a planar view, and also is in the form of elongated bar extending in a wavy-shaped manner toward a direction (width direction of the tire 2) of an axis (central axis O) of the tread molding part 20. The five design surface dividing mold parts 23 are identical in shape, and adjacent two design surface dividing mold parts 23 are in contact with each other at end surfaces in a circumferential direction. Each of surfaces oriented toward the radially inner side of the five design surface dividing mold parts 23 constitutes a circumferentially divided portion of the tread design surface 20a. In other words, the tread design surface 20a of the tread molding part 20 is divided in a circumferential direction and provided on the design surface dividing mold parts 23 provided on each of the plurality of segments 21. Therefore, the tread molding part 20 is divided into nine pieces in a circumferential direction, a tread design surface 20a is divided into 45 pieces in a circumferential direction.

As illustrated in FIG. 5, each of the tread design surfaces 20a provided on the design surface dividing mold parts 23 is provided with a plurality of projections 24 which protrude in a radial direction from the tread design surface 20a toward the radially inner side. The plurality of the projections 24 are used to form, for example, a groove or sipe, which constitutes a tread pattern, on the tread 2c of the tire 2 in vulcanization molding. The plurality of the projections 24 can be of various shapes or sizes (length) tailored to the tread pattern, such as a plurality of projections 24 extending in a tire width direction and a plurality of projections 24 extending in a tire circumferential direction.

The design surface dividing mold part 23 is preferably formed by casting of a metal material having high thermal conductivity such as, for example, an aluminum alloy. In this case, for example, rib-shaped or blade-shaped projections 24 made of steel can be provided by integrating with the design surface dividing mold part 23 in casting of the design surface dividing mold part 23.

As illustrated in FIGS. 5 to 7, between the holder 22 and each of the design surface dividing mold parts 23, a plate spring member 25 is disposed to which the five design surface dividing mold parts 23 are fixed and in which both ends of the plate spring member 25 in a circumferential direction are fixed to the holder 22. As a result of this, the segment 21 is configured in such a way that when the tread molding part 20 is opened after vulcanization molding of the tire 2, by elastic deformation of the plate spring member 25 toward a radially inner side, each of the plurality of the design surface dividing mold parts 23 is moved in a direction away from the holder 22 with the plate spring member 25 being elastically deformed toward a radially inner side and each of the plurality of the design surface dividing mold parts 23 being rotated around an axis parallel to an axis (central axis O) of the tread molding part 20.

In this embodiment, the plate spring member 25 is configured to include a plate spring body 25a, and a pair of fixing portions 25b which are connected integrally with both ends of the plate spring body 25a in a circumferential direction to constitute both ends of the plate spring member 25 in a circumferential direction.

Figure 8:
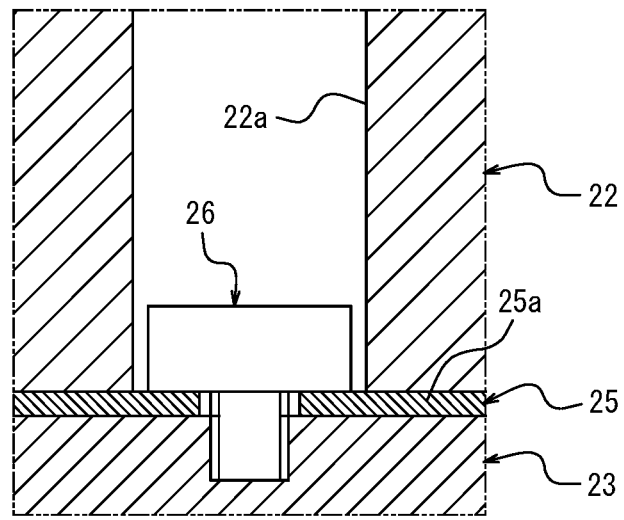
FIG. 8 is a cross-sectional view of the structure of a design surface dividing mold part fixed to a plate spring member.

The plate spring body 25a is in the form of arc in a planar view and is disposed in a manner sandwiched between the holder 22 and the five design surface dividing mold parts 23 to abut against a radially inner side surface of the holder 22 and also abut against a radially outer side surface of the five design surface dividing mold parts 23. Also, as illustrated in detail in FIG. 8, the plate spring body 25a is fixed to a radially outer side surface of each of the design surface dividing mold parts 23 by using a bolt 26 inserted into a hole 22a of the holder 22 from the radially outer side.

As illustrated in FIG. 6, one of the fixing portions 25b has a shape which is bent from an end of the plate spring body 25a in a circumferential direction toward radially outer side, and is fixed to an end surface of the holder 22 on the one side in a circumferential direction by using a fixing means (not illustrated) such as screw member. Similarly, the other of the fixing portions 25b has a shape which is bent from an end of the plate spring body 25a in a circumferential direction toward the radially outer side, and is fixed to an end surface of the holder 22 on the other side in a circumferential direction by using a fixing means (not illustrated) such as screw member.

Using fixing portions 25b fixed to the holder 22 as supporting points, the plate spring member 25 can elastically deform from a shape in the form of arc in which the plate spring body 25a is recessed toward a radially outer side in a planar view into a shape in which the plate spring body 25a projects toward a radially inner side. When the plate spring body 25a elastically deforms into a shape in which the plate spring body 25a projects toward a radially inner side, each of the five design surface dividing mold parts 23 fixed to the plate spring body 25a is moved together with the plate spring body 25a from a predetermined position toward a direction away from the holder 22. In this regard, the term "predetermined position" refers to a position at which each of the design surface dividing mold parts 23 is in an orientation by which the tread design surfaces 20a provided on the design surface dividing mold parts 23 is continuously connected, in a circumferentially arranged manner, with each other.

The segment 21 can be configured to include a plurality of plate spring members 25 disposed between the holder 22 and each of the design surface dividing mold parts 23 in a manner spaced apart in a direction parallel to an axis (central axis O) of the tread molding part 20. In this embodiment, as illustrated in FIGS. 5 and 7, two plate spring member 25 are provided between the holder 22 and each of the design surface dividing mold parts 23 in a manner spaced apart in a direction (width direction of the tire 2) parallel to an axis of the tread molding part 20. In this regard, the number of the plate spring members 25 can be one or can also be three or more.

Next, a method for vulcanization molding of a raw tire to produce a tire 2 having a predetermined shape by using a mold for forming a tire 1 having the above-described configuration, that is, a tire production method as an embodiment of this disclosure will be described.

First of all, a sidewall molding part 10 and a tread molding part 20 are opened to dispose a raw tire in the interior of a mold for forming a tire 1, and subsequently, the sidewall molding part 10 and the tread molding part 20 are closed.

Next, a bladder 7 is expanded by supplying pressurized steam to the bladder 7 disposed in the interior of the raw tire. As a result, sidewalls of the raw tire are pressed against a lower sidewall design surface 11a and an upper sidewall design surface 12a of the sidewall molding part 10, respectively, and a tread is pressed against a tread design surface 20a of the tread molding part 20. In this situation, a heater is used to heat the sidewall molding part 10 and the tread molding part 20, and such heat causes vulcanization of the synthetic rubber constituting the raw tire to form a tire 2 having a predetermined shape.

After forming of the tire 2 is completed, the sidewall molding part 10 and the tread molding part 20 are opened to remove a formed tire 2.

Figure 9:
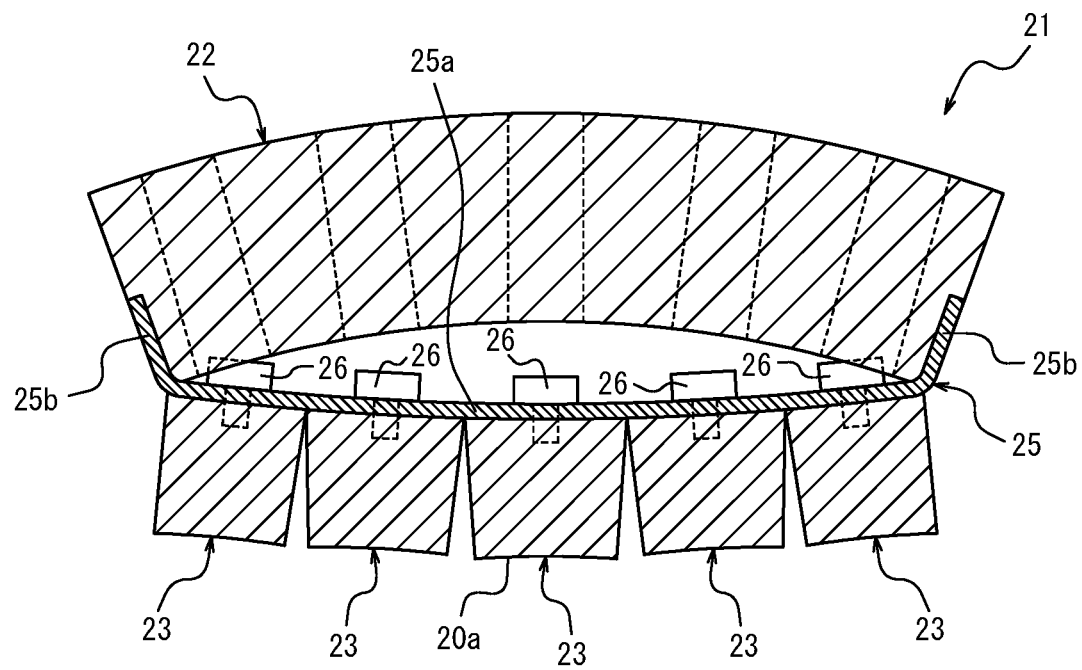
FIG. 9 is a cross-sectional view illustrating one segment illustrated in FIG. 5 in mold releasing of the tire, which is illustrated in a planar view.

When each of the segments 21 is moved toward the radially outer side to open the tread molding part 20 after vulcanization molding of the tire 2, driving force, which is required for resisting close contact of the tread 2c of the tire 2 with the inner circumferential surface of the tread design surface 20a and also for resisting undercut resistance caused between the tread 2c of the tire 2 and the projections 24, is applied to each of the design surface dividing mold parts 23 by the medium of the holder 22. Each of the five design surface dividing mold parts 23 in each of the segments 21 is fixed to the plate spring member 25 fixed to the holder 22, and therefore, is pulled in a direction away from the holder 22, in relation to the holder 22 moving toward a radially outer side, by close contact of the tread 2c of the tire 2 with the inner circumferential surface of the tread design surface 20a and undercut resistance caused between the tread 2c of the tire 2 and projections 24. As a result of this, when the tread molding part 20 is opened, as illustrated in FIG. 9, the plate spring body 25a of the plate spring member 25 elastically deforms in a direction in which the plate spring body 25a projects toward a radially inner side, and each of the design surface dividing mold parts 23 spontaneously moves (panning action) toward a direction away from the holder 22. At this time, the four design surface dividing mold parts 23, which are disposed at the sides of both ends of the four design surface dividing mold parts 23 in a circumferential direction in a manner deviated from the center of the holder 22 in a circumferential direction, are moved to be separated from the holder 22 with the four design surface dividing mold parts 23 being rotated around or revolve around an axis parallel to an axis (width direction of the tire 2) of the tread molding part 20, in such a way that to the orientations of the four design surface dividing mold parts 23 in relation to the tread 2c of the tire 2 are changed. Therefore, the four design surface dividing mold parts 23 are moved in a direction away from the tread 2c with the four design surface dividing mold parts 23 being rotated around an axis parallel to an axis of the tread molding part 20 in relation to the tread 2c of the tire 2.

As described above, in the tire production method by using the mold for forming the tire 1 of this embodiment, when the tread molding part 20 is opened after vulcanization molding of the tire 2, by elastic deformation of the plate spring member 25 toward a radially inner side, the tire 2 can be released from the tread molding part 20 with the design surface dividing mold parts 23 being rotated around an axis parallel to an axis of the tread molding part 20 in relation to the tread 2c of the tire 2. As a result of this, the design surface dividing mold parts 23 disposed especially on the sides of both ends in a circumferential direction can be in an orientation by which undercut resistance of the tread 2c of the tire 2 caused by the projections 24 is reduced, and also, the tread 2c of the tire 2 can be released from the tread molding part 20. Therefore, undercut resistance of the tread 2c caused by the projections 24 in mold releasing of the tire 2 can be reduced.

Therefore, the mold for forming the tire 1 or the tire production method of this embodiment can suppress defects such as permanent deformation in the formed tread 2c of the tire 2 and the failure of the projections 24 caused by excessively high undercut resistance in mold releasing of the tire 2 from the tread molding part 20.

Also, when the tread molding part 20 is opened, by the elastic deformation of the plate spring member 25 toward the radially inner side, the design surface dividing mold parts 23 disposed on the sides of both ends in a circumferential direction rotate in relation to the tread 2c of the tire 2. As a result, the tread 2c of the tire 2 is gradually released from the sides of both ends of the segment 21 in a circumferential direction. As a result of this, outside air is gradually introduced between the tread design surface 20a and the tread 2c from the side of both ends of the tread design surface 20a and the tread 2c in a circumferential direction to allow for the tread 2c of the tire 2 in close contact with the tread design surface 20a to be peeled off more effectively from the tread design surface 20a. Therefore, the tire 2 can be released more easily from the tread molding part 20.

In addition, the mold for forming the tire 1 or the tire production method of this embodiment can reduce undercut resistance of the tread 2c caused by the projections 24 in mold releasing of the tire 2, and also, allows for the tread 2c of the tire 2 in close contact with the tread design surface 20a to peel off from the tread design surface 20a more effectively. Therefore, driving force applied to the segments 21 in mold releasing of the tire 2 can be reduced, and as a result, the entire production device including the mold for forming the tire 1 can be downsized to reduce the production costs.

In addition, the mold for forming the tire 1 or the tire production method of this embodiment can reduce undercut resistance of the tread 2c caused by the projections 24 in mold releasing of the tire 2. Therefore, a tire 2 having a more complex tread pattern can be produced relatively easily. As a result of this, flexibility in the production of a tire 2 having a complex tread pattern can be improved.

In the mold for forming the tire 1 of this embodiment, the plate spring member 25 is configured in such a way that one of the fixing portions 25b constituting one end in a circumferential direction is fixed to an end surface of the holder 22 on one side in a circumferential direction, and the other of the fixing portion 25b constituting the other end of the plate spring member 25 in a circumferential direction is fixed to an end surface of the holder 22 on the other side in a circumferential direction. As a result, at a portion between these fixing portions 25b, that is, the plate spring body 25a, the plate spring member 25 can easily elastically deform toward a radially inner side. In consequence, undercut resistance of the tread 2c caused by the projections 24 in mold releasing of the tire 2 can be reduce more effectively.

Also, the mold for forming the tire 1 of this embodiment is configured to include a plurality of plate spring members 25 disposed in a manner spaced apart in a direction parallel to an axis of the tread molding part 20. Therefore, the plurality of the design surface dividing mold parts 23 can be configured to be supported by a plurality of plate spring members 25. As a result of this, when the plate spring member 25 elastically deforms from a shape in the form of arc in which the plate spring member 25 is recessed toward a radially outer side into a shape in which in which the plate spring member 25 projects toward a radially inner side, the plurality of the design surface dividing mold parts 23 are moved toward in a direction away from the holder 22 with the plurality of the design surface dividing mold parts 23 being rotates more stably by elastic deformation of the plate spring member 25. In consequence, undercut resistance or close contact of the tread 2c caused by the projections 24 in mold releasing of the tire 2 can be reduced more effectively.

EXAMPLES

As a mold for forming a tire of Example, a mold for forming a tire having the above-described configuration was employed in which:

the design surface dividing mold part is made of an aluminum alloy (AC4C) and the difference between the maximum inner diameter and the minimum inner diameter is 35 mm;

a holder is made of low carbon steel (S45C equivalent material) by using a machining process; and plate springs deform by about 1 mm under application of a load of 100 kg. The mold for forming the tire was used to form to form a tire with an inner diameter of 600 mm and a tire width of 255 mm, and external force (driving force to be applied to the holder) required for mold releasing of the tire was measured. As a result of this, in comparison with a mold for forming a tire of Comparative Example having a configuration in which the design surface dividing mold part is fixed to the holder, it has been demonstrated that the mold for forming the tire of Example can reduce the external force by roughly 22%.

As a matter of course, this disclosure is not limited to the above-described embodiment and a variety of modifications are possible without departing from the scope of this disclosure.

For example, in the above-described embodiment, each of the plurality of segments 21 includes five design surface dividing mold parts 23; however, each of the plurality of segments 21 may include four or less design surface dividing mold parts 23 or may include six or more design surface dividing mold parts 23 as long as each of the plurality of segments 21 includes a plurality of design surface dividing mold parts 23.

Also, in the above-described embodiment, the holder 22 of the segment 21 is fixed to the intermediate container 5. However, the holder 22 can be integrated with the intermediate container 5.

REFERENCE SIGNS LIST

1 Mold for forming a tire
2 Tire
2a Sidewall
2b Sidewall
2c Tread
3 Lower container
4 Upper container
5 Intermediate container
5a Tapered surface
6 Outer ring
6a Tapered surface
7 Bladder
10 Sidewall molding part
11 Lower sidewall molding part
11a Lower sidewall design surface
12 Upper sidewall molding part
12a Upper sidewall design surface
20 Tread molding part
20a Tread design surface
21 Segment
22 Holder
22a Hole
23 Design surface dividing mold part
24 Projection
25 Plate spring member
25a Plate spring body
25b Fixing portion
26 Bolt

The invention claimed is:
1. A mold for forming a tire for vulcanization molding of an unvulcanized raw tire into a tire, the mold comprising:
an annular tread molding part which is divided into a plurality of segments arranged in a circumferential direction and which is configured to be opened and closed by moving each of the segments in a radial direction, wherein each of the segments includes a holder to be driven toward a radially outer side when the tread molding part is opened, a plurality of design surface dividing mold parts, each of which includes a tread design surface for forming a tread of the tire and which are disposed in a circumferentially arranged manner on a radially inner side of the holder, and a plate spring member which is disposed between the holder and the plurality of the design surface dividing mold parts and to which the plurality of the design surface dividing mold parts are fixed and in which both ends of the plate spring member in a circumferential direction are fixed to the holder, and when the tread molding part is opened after vulcanization molding of the tire, by elastic deformation of the plate spring member toward a radially inner side, the plurality of the design surface dividing mold parts are moved in a direction away from the holder with the plurality of the design surface dividing mold parts being rotated around an axis parallel to an axis of the tread molding part.

2. The mold for forming the tire according to claim 1, wherein one end of the plate spring member in the circumferential direction is fixed to an end surface of the holder on one side in the circumferential direction and the other end of the plate spring member in the circumferential direction is fixed to an end surface of the holder on the other side in the circumferential direction.

3. The mold for forming the tire according to claim 2, the mold comprising:

a plurality of plate spring member disposed in a manner spaced apart in a direction parallel to the axis of the tread molding part.

4. The mold for forming the tire according to claim 1, the mold comprising:

a plurality of plate spring member disposed in a manner spaced apart in a direction parallel to the axis of the tread molding part.

5. A tire production method for vulcanization molding of an unvulcanized raw tire to produce a tire by using a mold for forming a tire comprising an annular tread molding part which is divided into a plurality of segments arranged in a circumferential direction and which is configured to be opened and closed by moving each of the segments in the radial direction, wherein the tread molding part is provided with a plurality of design surface dividing mold parts, each of which is fixed to a plate spring member and which are provided in a circumferentially arranged manner, wherein the plate spring member is disposed between the holder and the plurality of the design surface dividing mold parts and both ends of the plate spring member in the circumferential direction are fixed to the holder, and when each of the segments is moved toward a radially outer side to open the tread molding part, the tire is released from the tread molding part with the plate spring member being elastically deformed toward a radially inner side and the plurality of the design surface dividing mold parts being moved in a direction away from the holder and rotated around an axis parallel to an axis of the tread molding part.

* * * * *